W. H. HARGRAVE.
WEDGE FOR FELLING TREES.
APPLICATION FILED JAN. 24, 1914. RENEWED MAR. 22, 1917.
1,244,327.
Patented Oct. 23, 1917.
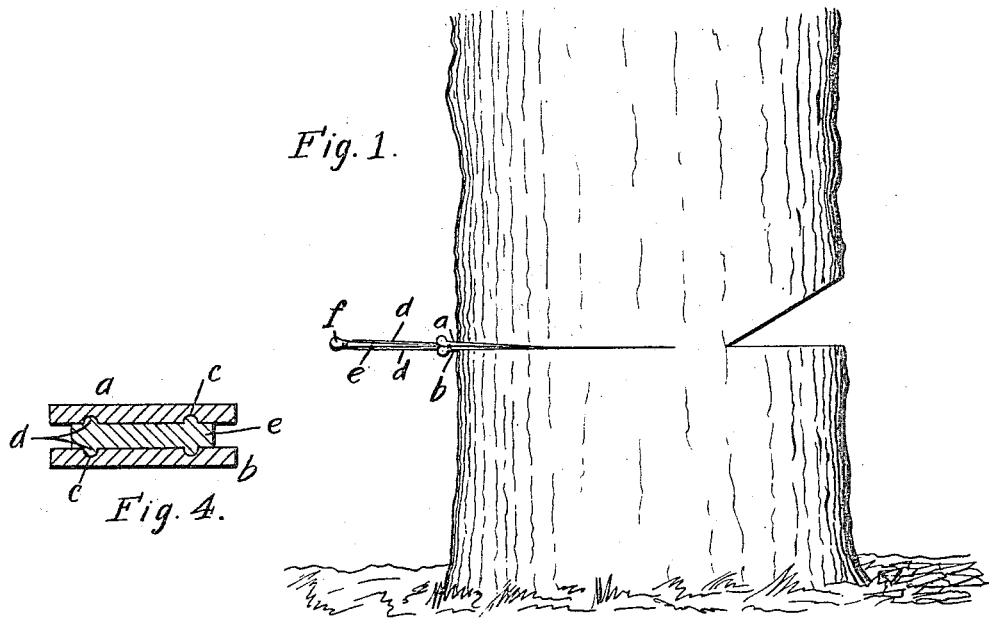
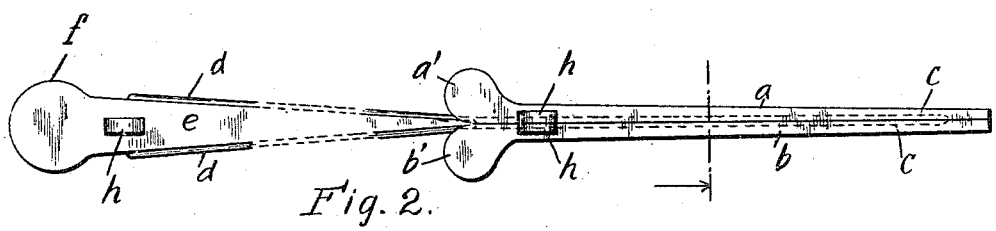
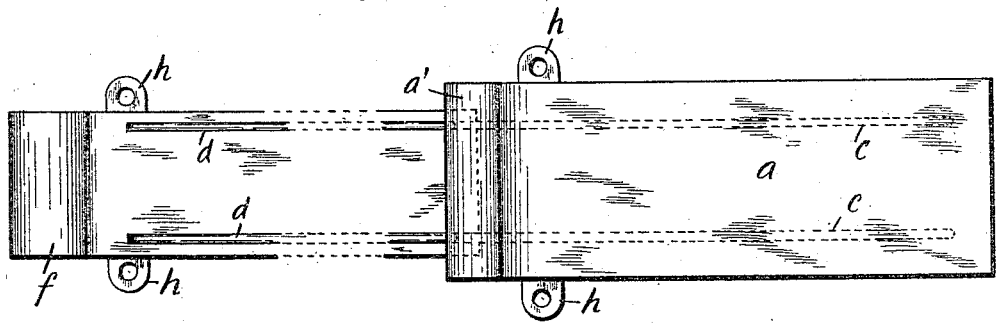
WITNESSES:
INVENTOR
William H. Hargrave.
BY
ATTORNEY

UNITED STATES PATENT OFFICE.

WILLIAM HENRY HARGRAVE, OF PORTLAND, OREGON.

WEDGE FOR FELLING TREES.

1,244,327.  Specification of Letters Patent.  Patented Oct. 23, 1917.

Application filed January 24, 1914, Serial No. 814,253. Renewed March 22, 1917. Serial No. 156,782.

*To all whom it may concern:*

Be it known that I, WILLIAM H. HARGRAVE, a citizen of the United States, and a resident of Portland, Multnomah county, State of Oregon, have invented a new and useful Improvement in Wedges for Felling Trees, of which the following is a specification.

The object of my invention is to provide a wedge for felling trees which will perform the work in a more efficient manner than the wedges heretofore in use. I also purpose to provide a wedge which will have a longer life of service. The details of construction and the mode of using my wedge I hereinafter fully describe.

In the accompanying drawings:

Figure 1 shows the base of a tree ready for felling with my wedge inserted as in practice;

Fig. 2 is a side view of my wedge with the spreader member inserted just between the two companion members, but not driven in to spread the latter;

Fig. 3 is a top view of the same parts shown in Fig. 2; the parts being arranged in Figs. 2 and 3 in the same position; and Fig. 4 is a cross-section along the line indicated in Fig. 2, looking in the direction pointed by the arrow.

My wedge is made of any suitable metal, and comprises two companion members, $a$, $b$, preferably wedge shape, provided on their inner faces with grooves, $c$, for receiving the longitudinal ribs, $d$, of the wedge-shape spreader member $e$. The grooves and ribs, $c$, $d$, of the parts serve to guide the spreader-member, $e$, while being driven in; for without such provision the spreader-member, $e$, would have a tendency to be displaced. The parts, $a$, $b$, at their heels $a'$, $b'$ are made with head-like enlargements and the head-end of the spreader-member, $e$, is made with an enlargement as at $f$.

The described construction strengthens the parts at those places where they have to sustain the heaviest blow of the sledge.

In order to provide means for temporarily tying the parts together when carrying them about from place to place, I make the parts with ears $h$, through which is inserted a wire or other fastening means.

The mode of operating with my wedge is as follows: When the tree has been sawed at one side and a kerf made at the opposite side for the wedge, the two companion members of the latter are inserted in such kerf, then the spreader member, $e$, is inserted between the companion members, and is driven in.

I claim:

1. A wedge consisting of two companion wedge-shape members and a wedge-shape spreader member, the faces of the members bearing on each other being respectively made with means for guiding the spreader-member between the companion members while the former is being driven in, the heel of each of the companion members, and the head of said spreader-member being made with massive enlargements for the purpose specified.

2. A wedge consisting of two companion members and a spreader member, the faces of the members bearing on each other being respectively made with means for guiding the spreader-member between the companion members while the former is being driven in, and the members being made with registering ears for temporarily tying them together.

3. A wedge consisting of two companion wedge-shape members and a wedge-shape spreader member, the faces of the members bearing on each other being respectively made with ribs and grooves for guiding the spreader-member between the companion members while the former is being driven in, the heel of each of the companion members and the head of said spreader member being made with massive enlargements for the purpose specified, and the members being made with registering ears for temporarily tying them together.

WILLIAM HENRY HARGRAVE.

Witnesses:
 W. C. SCHMITT,
 CECIL LONG.